United States Patent [19]
Goetz et al.

[11] 3,832,712
[45] Aug. 27, 1974

[54] DOPPLER SIGNAL SIMULATOR
[75] Inventors: Philip J. Goetz, Pleasantville, N.Y.;
Kaya Erk, Ankara, Turkey
[73] Assignee: The Singer Company, Little Falls, N.J.
[22] Filed: Feb. 15, 1973
[21] Appl. No.: 332,742

[52] U.S. Cl. ............................................. 343/17.7
[51] Int. Cl. ................................................ G01s 7/40
[58] Field of Search ................................... 343/17.7

[56] References Cited
UNITED STATES PATENTS
3,375,518  3/1968  Mader et al. ...................... 343/17.7
3,731,309  5/1973  Meyer et al. ....................... 343/17.7

Primary Examiner—T. H. Tubbesing

[57] ABSTRACT

A doppler signal simulator in which a composite doppler spectra including background noise, signal, leakage signal, and image beam signals simulating, in proper sequence, each of the four beams of a doppler navigation system is shown. White noise is generated digitally to provide background noise, and to obtain the doppler return spectra by filtering with digital commutating filters controlled by a plurality of center frequencies generated by logic circuits. Leakage and image signals are generated and added to the doppler spectra and noise to provide the four composite signals which are then multiplexed and filtered to provide the final output. Gain control is provided for the various signals to simulate various flight conditions. Selection logic allows selecting a signal to test the post IF and tracker or tracker alone. All controls are adaptable to digital control so that comprehensive testing under control of a digital computer is possible.

33 Claims, 13 Drawing Figures

DOPPLER SIGNAL SIMULATOR

BACKGROUND OF THE INVENTION

This invention relates to doppler navigation systems in general and more particularly to a doppler signal simulator useful in testing such systems.

The desirability of being able to test doppler navigation systems on the bench during the various stages of design, manufacturing and maintenance is quite evident. Since the doppler system is used in an aircraft navigation system, extensive testing in actual flight could become prohibitively expensive. Thus, the need for doppler signal simulators has been long recognized and various such simulators have been used. In most cases these have been analog devices. Because of the high accuracy requirements placed on them, they have been expensive and complex. The problems involved with analog systems are discussed in U.S. application Ser. No. 196,326 now U.S. Pat. No. 3,731,309 filed by B. A. Meyer et al. on Nov. 8, 1971 and assigned to the same assignee as the present invention. That particular application discloses a simulator utilizing digital techniques in an attempt to overcome some of the problems found in analog simulators.

Although the system disclosed therein works well in a limited area of testing, i.e, the frequency tracker, it does not provide as complete a test as is desired. As disclosed in the above application, the doppler spectra includes a return signal having a gaussian distribution about a center frequency and wide band background noise. At the doppler frequency tracker input this is essentially true. However, before entering the frequency tracker the signal is first processed in a post IF stage (after being received and processed in the receiver front end). At entry into the post IF a leakage signal comprising a portion of the transmitted signal is present and must be removed. Also present at both the post IF and tracker inputs are image beam signals, false signals caused by radiation along a beam other than the one being transmitted. Simulation of these portions of the signal is not provided by the simulator of the above application.

In a typical doppler system a plurality of beams are transmitted in different directions in a sequential manner. Thus the received input will be a plurality of spectra each having a different center frequency dependent on the beam direction and aircraft velocity and direction. For example, beams transmitted in front of the aircraft as it flies forward will have positive doppler shifts and beams transmitted behind will exhibit negative shifts. As the velocity and direction varies the shifts likewise vary. Thus it is desirable to simulate a plurality of sets of beam signals for various flight velocities and directions.

It will also be recognized that the various parameters, i.e., signal, noise, leakage, image beam signal, may vary in amplitude and amplitude ratios under different conditions. For example as altitude increases, the signal becomes weaker and signal to noise ratio changes. To provide accurate simulation, all these various conditions must be simulated. It can be seen that to run a complete test covering a significant number of the possible operating condition could be quite time consuming. Thus it is also a desirable feature in a doppler simulator that it be adaptable to automatic testing to avoid the high cost of manual testing.

SUMMARY OF THE INVENTION

The doppler signal simulator of the present invention fills the needs described above. The simulator generates two white noise signals using digital techniques; one is used to simulate background noise and the other used in generating a doppler spectra signal. Two crystal oscillators, one to be used during system test, when both the post IF and tracker are tested, and one to be used for tracker test, provide outputs which are divided down to provide a plurality of doppler center frequencies. Logic means select four of these divided frequencies to simulate the four beam signal center frequencies. These are then supplied to four commutating filters which have the noise generator signal as another input and which will provide four outputs closely simulating the spectra of the four doppler signals. The background noise, a leakage signal from a leakage generator, and the image signal are then added to the four doppler signals to produce composite signals accurately simulating the spectra of the actual signals to be expected under flight conditions. The four composite signals are then multiplexed to provide a serial output and filtered before being provided as inputs to the post IF or tracker. (Selection logic allows operation in either mode. In the tracker mode no leakage is added since this is removed in the post IF). Controls are provided so that each of the signals may be controlled in amplitude to simulate various flight conditions. Each control input is adaptable for digital control so that the simulator may be controlled by a digital computer to automatically run a comprehensive series of tests over a long period of time without requiring constant attendance of test personnel.

DETAILED DESCRIPTION OF THE PREFERRED EMBODIMENT

Figure 1:
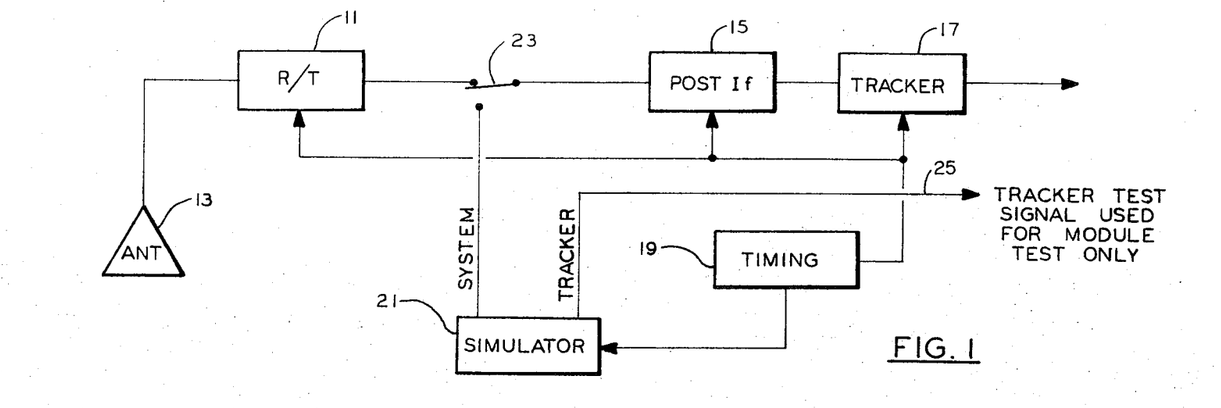
FIG. 1 is a basic block diagram of the doppler system showing how the simulator of the present invention is connected into the system.
Figure 2:
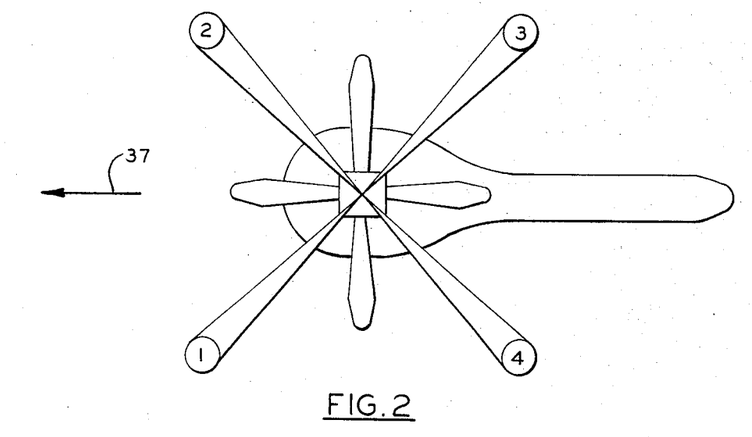
FIG.2 is a plan view of an aircraft having a doppler navigation system installed showing the position of the various beams of the sytem.

FIG. 1 is a basic block diagram of the doppler system showing how the simulator is connected to test the system. In normal operation of the system the receiver-transmitter 11 will sequentially transmit and receive through antenna 13, four different beams projecting in different directions in relation to the aircraft. This is shown on FIG. 2. First, energy will be transmitted in the direction of beam 1, then beam 2 will be transmitted, then beam 3 and then beam 4. This sequence continues as long as the system is operating. Energy is received by the antenna 13 and the transmitter-receiver 11 picks up this signal and provides it to the post IF module 15. The signal which is transmitted is frequency modulated at a frequency of 30 Kilo Hertz, for example. The return signal is not a single discrete frequency, but instead a spectra whose band width is a function of the antenna beam widths. The center frequency of each spectra, because of the doppler shift, will have been shifted from 30 Kilo Hertz plus or minus the doppler signal. In the tracker 17 this signal is then processed to provide outputs indicative of the center frequency of the spectra for each beam. A timing block 19 provides the necessary timing signals to cause beam switching, etc. As shown, the simulator 21 has two outputs, the first of which may be inserted through a switch 23 into the post IF. This output is called the system output since it tests a large portion of the system. The second output on line 25, called the tracker output, is used only during module test. An input from the timing is also shown as going into the simulator 21. Although the simulator has its own timing, as will be described below, when operating in the system mode, outputs from timing clock 19 are used instead.

To understand what is required of simulator 21, it is helpful to examine the nature of a typical doppler signal. This is shown on FIG. 3. Since in doppler systems events in the frequency rather than the time domain are of interest, a plot of the doppler signals showing power density versus frequency is made. This is essentially what one would see at the output of a suitable spectrum analyzer having a doppler signal as an input. The first noticeable thing about the signal is that there is a significant amount of essentially white noise shown as area 27. The band width of the noise is determined by a band filter in the receiver-transmitter. On top of the noise is shown a doppler spectra signal 29 representing a positive shift and a doppler spectra signal 31 indicating a negative shift. The band width of each spectra varies and typically is a percentage of the frequency shift, for example 30 percent, i.e., 15 percent on each side. Between the two spectra at a frequency $f_0$ is a line 33 which represents the 30 Kilo Hertz modulation frequency. This is called leakage and will be explained in more detail below. Also shown are some leakage sidebands 35. The signal 29 represents the signal which would be received from beams 1 or 2 of FIG. 2, assuming the aircraft was flying in the direction of arrow 37. Signal 31 represents the signal which would be obtained from beams 3 or 4 of FIG. 2, again assuming flying in direction of arrow 37. In one case, beams 1 and 2 which are forward of the vehicle would cause a positive shift and beams and 3 and 4 would cause a negative shift. Because of the time multiplexing of the four beams these two signals will not appear at the same time.

Figure 3:
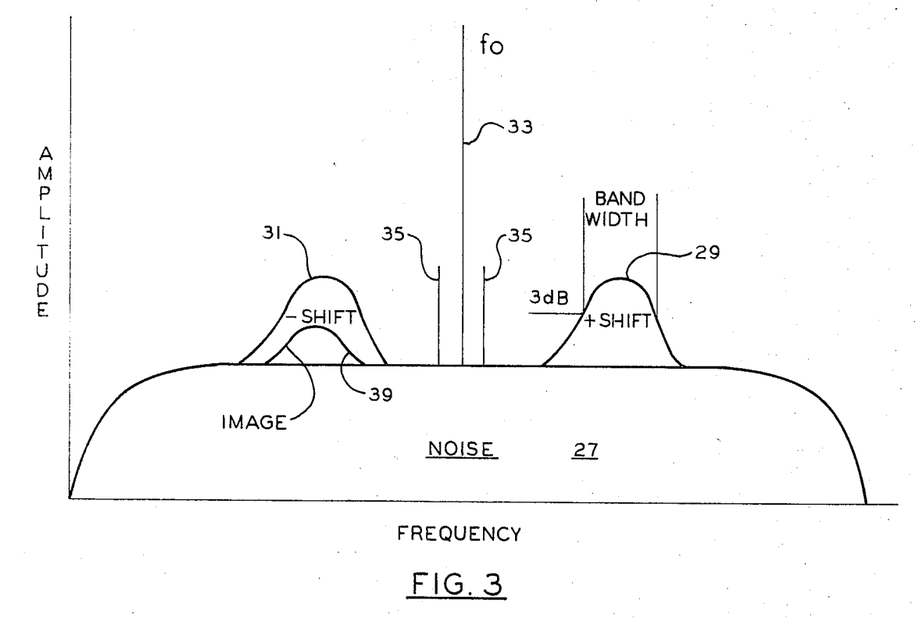
FIG. 3 is a frequency plot showing the various components of a typical doppler signal.

Assume that the receiver-transmitter is transmitting and receiving beam 1. Because of the nature of the antenna some radiation will be reflected and will go along the path that is normally associated with beam 3. This energy will be received as if beam 3 were being transmitted and will form an image beam signal 39. This signal will normally be small with respect to signal 29. However, if the aircraft maneuvers in such a way that beam 3 for example, is pointing directly down or almost directly down and beam 1 is pointing far out, the return signal 29 from beams 1 may be smaller than the image signal which is like beam 3. In this case an error would result if the system was not able to recognize that the image 39 was a false signal. Thus, to accurately simulate the actual doppler return signal, provisions must be included to simulate these image beams.

Returning to the question of leakage, a certain amount of transmitter energy will be directly received due to reflections in the antenna. This leakage energy is represented by the line 33 on FIG. 3. Furthermore, this leakage may be different in both amplitude and phase for each of the four beam periods. This results in sidebands on the leakage that occur at multiples of the beam switching rate, typically 7.5Hz. These sidebands are depicted by lines 35. The post IF must eliminate both leakage components 33 and 35 from the input signal.

Summarizing what is required in simulating the signal of FIG. 3, it can be seen that there are many basic quantities involved: the level of the white noise 27, the amplitude, center frequency, and bandwidth of the doppler spectra 29 or 31, the level of the leakage signal 33 and its sidebands 35 and finally the amplitude of the image signal 39.

Figure 4:
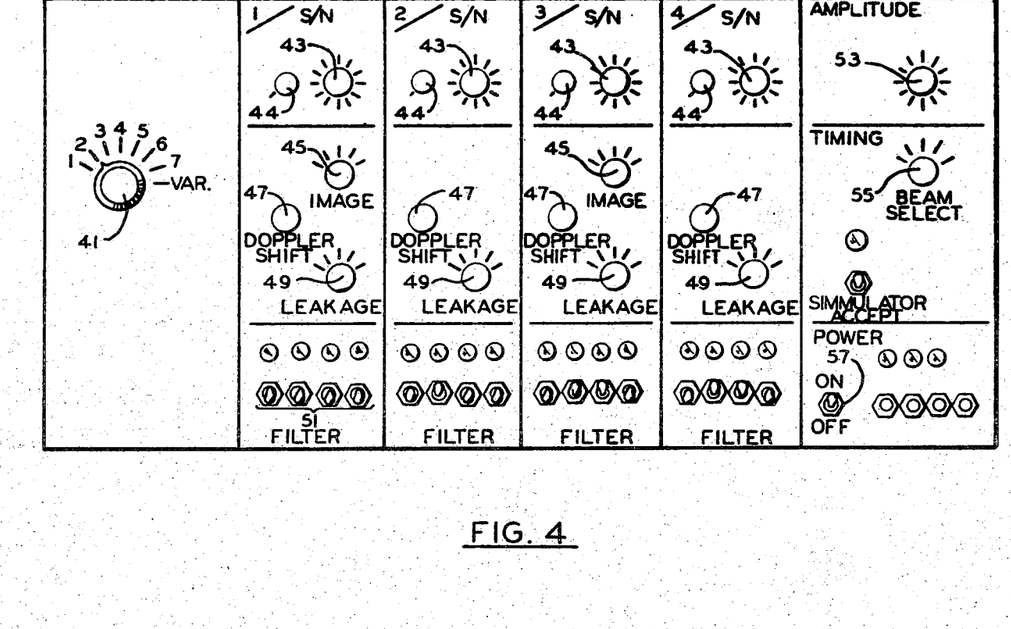
FIG. 4 is a view of the front panel of the doppler signal simulator of the present invention showing the various controls available.

To provide an idea of the various controls available in the simulator, a front view of the front panal of the simulator is shown in FIG. 4. On the far left is a control 41 to adjust the center frequencies of the doppler shift. Each numbered position of control 41 will provide a plurality of constant sets of signals. That is, for each of the positions of the switch, four center frequencies representing a particular one of a plurality of different flight directions will be simulated. There is also provided a position where the doppler shift for each beam may be manually varied by a control to be described below. Proceeding to the right are four sections, one being provided for each beam. Within each of these there are provided the controls 43 and 44 to control the signal to noise ratio for that beam. For beams 1 and 3 there is a control 45 to simulate image signal amplitude. This control is not necessary on all beams since testing two of the beams will be sufficient to prove out the system. For each beam there is also provided a control 47 to regulate the amount of doppler shift when switch 41 is in the variable position. There is also provided for each beam a leakage control 49 through which various amounts of leakage signal may be inserted. The final controls are a set of four switches 51 having binary values by which the bandwidth of the doppler signal may be adjusted to simulate different radar antennas. At the far right of the control panel is an amplitude control 53 which controls the overall amplitude of the signal provided to the doppler system.

Below that is a timing control 55 which permits testing of any of the beams separately or all beams together. And finally, on the bottom section is a power switch 57 to turn on this simulator.

Figure 5:
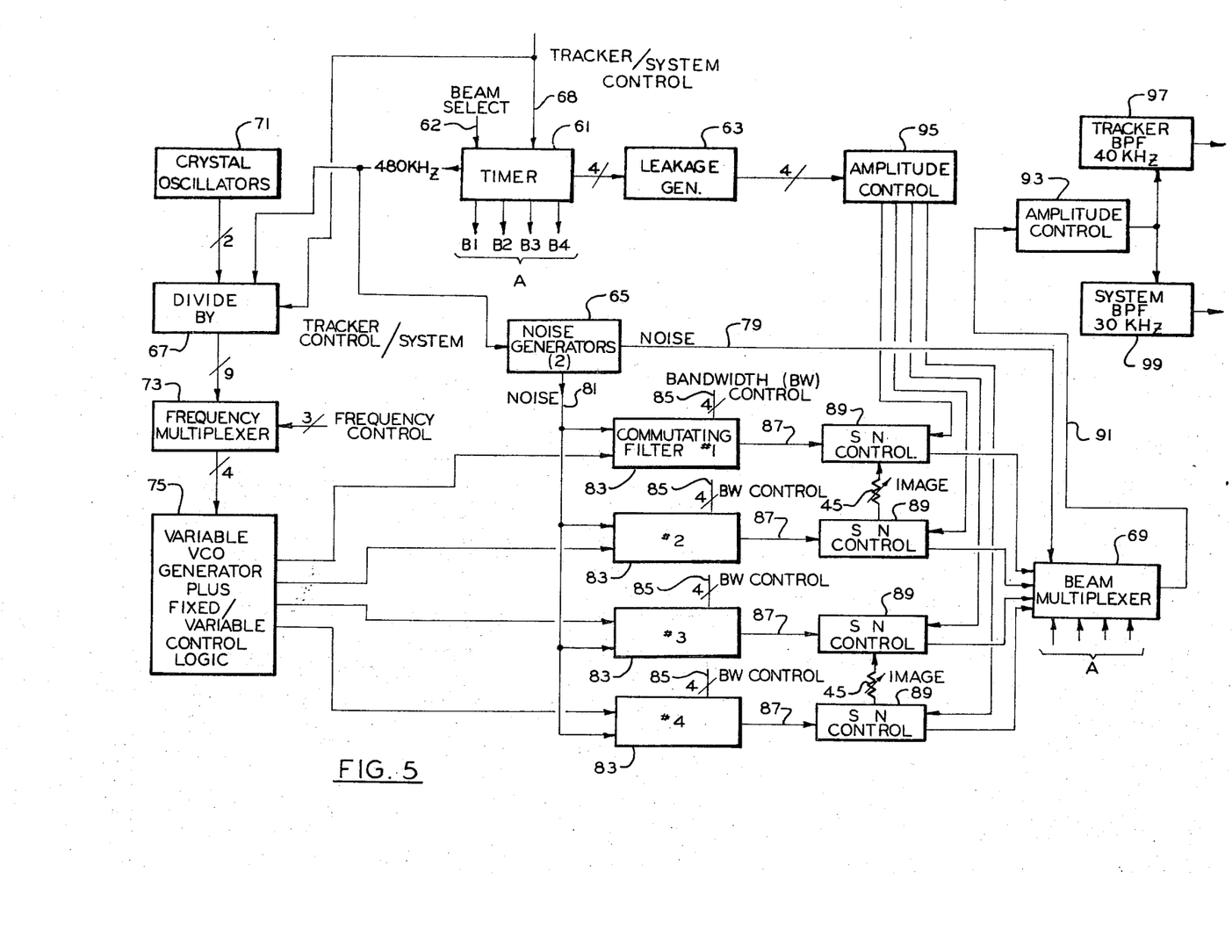
FIG. 5 is an overall block diagram of a preferred embodiment of the doppler signal simulator of the present invention.

FIG. 5 is a basic block diagram of the doppler signal simulator. A timer module 61 provides timing signals and beam switching signals labeled B1, B2, B3 and B4 indicated collectively by the letter A, to beam multiplexer 69. A beam select input line 62 which obtains inputs from control 55 of FIG. 4 allows any one or all beams to be selected for testing. An output of the timer 61 comprising a 480 KHz signal is provided to leakage generator 63, noise generators 65 and the divide by section 67. An input line 68 permits timing signals from the doppler system rather than the timer to be used when in system test mode. A pair of crystall oscillators in block 71 generate signals at two different frequencies, one to be used for system test and the other to be used for tracker test. The output of these two oscillators are provided to a divide by module 67 where one of them is divided down in counters to provide nine separate output frequencies. The selection of which oscillator is to be used is determined by the input on line 68. The nine frequencies are provided to a frequency multiplexer block 73 which has as a control input a 3-bit binary code from switch 41 shown on FIG. 4. In this block, four of the nine frequencies are then selected as outputs and provided to a logic block 75 used in selecting between the fixed outputs from block 73 or variable outputs from voltage control oscillators contained within block 75.

Noise generator block 65 contains two noise generators. The output of one noise generator is provided on line 79 to beam multiplexing block 69. This noise is used to provide the white noise required as shown on FIG. 3. The output of the second noise generator is provided on line 81 to four commutating filters 83. Each of the commutating filters in addition to the input from noise generator 65 on line 81 has an output from block 75 which represents the center frequency of the doppler signal of its respective beam. In the commutating filter the noise will be shaped into a dopler signal such as signal 29 or 31 of FIG. 3 with the center frequency of the signal equal to the input from block 75 and having the proper shape. Each of the commutating filters 83 has a bandwidth input 85 which comprises four digital switch inputs from switches 51 shown on FIG. 4. This will provide the required bandwidth in a manner to be described below. The respective beam outputs on lines 87 are each provided to a signal to noise control module 89. Essentially, this is a variable gain amplifier which controls the amplitude of each doppler spectra. Since the noise output on line 79 is at a fixed level, the signal to noise ratio for any beam period can be set to the desired value by attenuating the output of the commutating filters 83 by means of a signal to noise control attenuator 89. The leakage signal is also added now. The output of leakage generator 63 is first provided to an amplitude control block 95 where the amplitude of the leakage signal may be controlled. The output of block 95 is then summed with the doppler signal in block 89. At this point the image signal is also inserted by providing a selected portion of the beam 2 and 4 signals to beams 1 and 3 through potentiometers 45 corresponding to controls 45 on FIG. 4.

The four doppler signal outputs from blocks 89 are provided to beam multiplexer block 69 along with the noise signal on line 79. Since in the actual system these signals are present in sequence, the simulator then sequentially selects each of the four signals (assuming control 55 on FIG. 4 is in the position where all beams are selected). The noise background 27 is added and the resultant time multiplexed signal is provided as an output on line 91 to an attenuator block 93 where the amplitude of the overall signal is controlled. The output of the final amplitude control block 93 is provided to two band pass filters 97 and 99. Band pass filter 97 is a band pass filter centered at 40 kilo Hertz and provides the output for testing the tracker. Filter 99 is centered at 30 Kilo Hertz and provides the output for testing the system.

Figure 6:
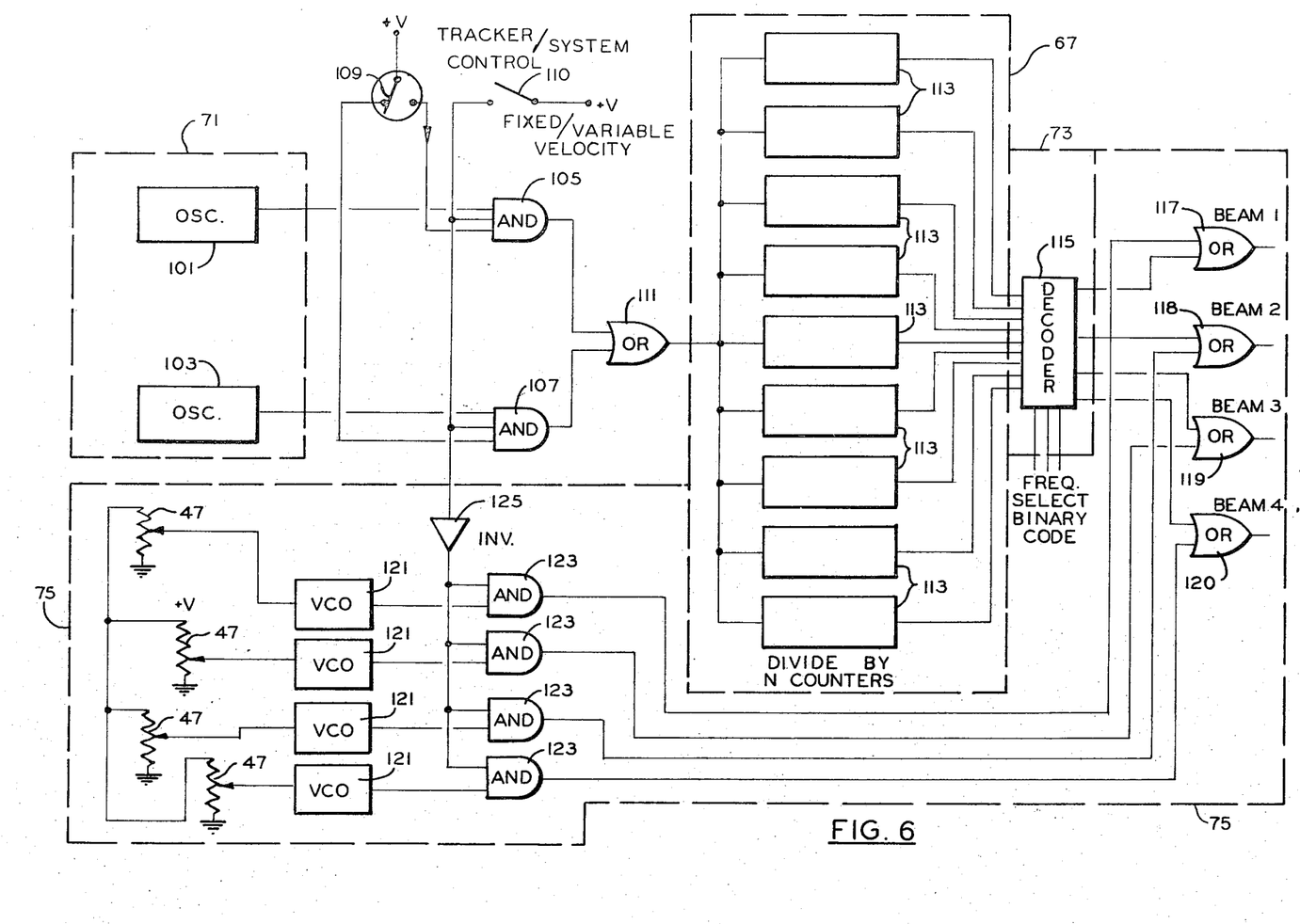
FIG. 6 is a block-logic diagram of a portion of FIG. 5 showing the generation of four doppler center frequencies.

FIG. 6 is a block-logic diagram showing the basic elements contained in blocks 67, 71, 73, and 75 of FIG. 5. A pair of crystal oscillators 101 and 103 provide the two frequency outputs to AND gates 105 and 107 respectively. A single pole double throw switch 109 having as an input a positive voltage provides for selection between the system and tracker outputs. When the switch 109 is in the position shown, it will enable AND gate 107 permitting the output of oscillator 103 to be used in the simulator to provide the proper outputs for tracker test. When the switch 109 is in the other position (not as shown) AND gate 105 will be enabled to allow the output of oscillator 101 to be used in the simulator for system test. The respective oscillators 101 and 103 will have frequency outputs which when further operated upon, will respectively provide the signals referenced to either the 30 or 40 Kilo Hertz offset frequency. A further input to AND gates 105 and 107 is provided from a switch 110 which will be closed when switch 41 of FIG. 4 is in any of the fixed positions, and be opened if switch 41 is in the variable position. This will disable AND gates 105 and 107 when variable control is desired. The outputs of AND gates 105 and 107 are provided to an OR gate 111. OR gate 111 will have at its output the one of the selected oscillator frequencies and will provide it to a plurality of nine divide by $n$ counters 113, for example (more or less counters may be used depending on the number of different velocities to be simulated). These are binary counters well-known in the art and will not be described in detail herein. The counters are arranged to provide outputs which represent either 30 or 40 Kilo Hertz plus or minus various doppler shifts. (In actuality four times the required 30 or 40 KHz signal since further division takes place as will be seen below.) The nine different frequency outputs each representing a different frequency shift and thus a different velocity, are provided to a decoding block 115, which has as its other input a 3-bit binary code from switch 41 of FIG. 4. Decoder block 115 is essentially a plurality of gates which will select four of the nine inputs as outputs in response to the binary code input. Such decoding logic is well-know in the art and will not be shown in detail herein. The four outputs of the decoder 115 are provided respectively to four OR gates 117 through 120 which provide as their outputs a signal representing the center frequencies of beams 1 through 4. The second inputs to OR gates 117 through 120 are provided from four voltage controlled oscillators 121. Each of the voltage controlled oscillators 121 has as its input a voltage from a potentiometer 47 corresponding to control 47 of FIG. 4. The voltage controlled oscillator will provide an output frequency which is proportional to its input voltage in a manner well known in the art. The outputs of each of the voltage controlled oscillators 121 are provided to an AND gate 123 which will be enabled only when the variable frequency position is selected with switch 41 of FIG. 4. The enabling signal is provided from switch 110 through an inverter 125. Thus, when switch 110 is opened, indicating that variable frequency control is desired inverter 125 will have a zero input and will provide a high output to enable gates 123 and permit the pulse trains from voltage controlled oscillators 121 to pass through the gates and be provided to OR gates 117 through 120.

Figure 7:
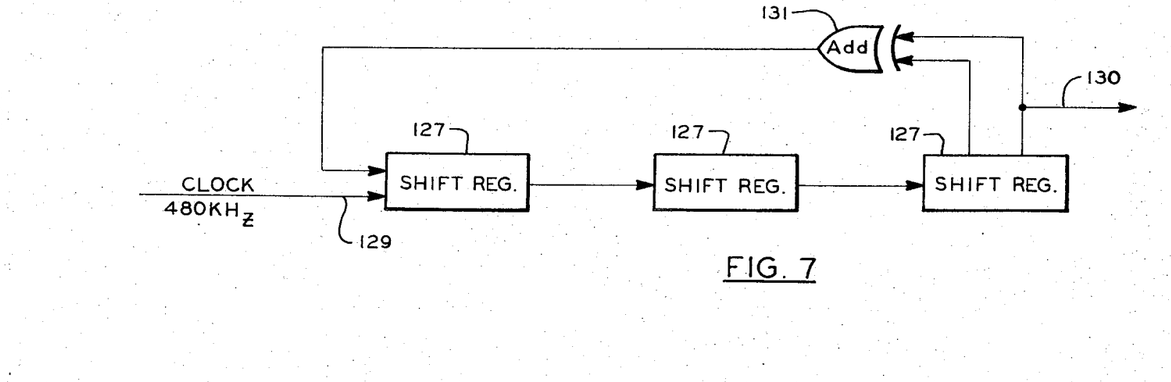
FIG. 7 is a block-logic diagram of the noise generator of FIG. 5.
Figure 8:
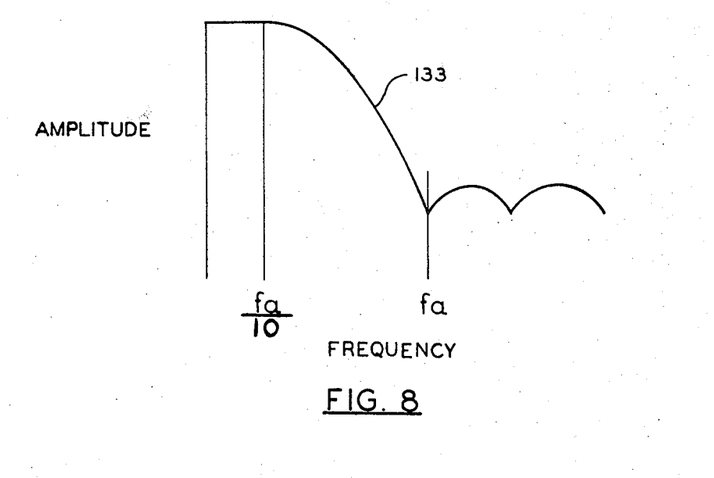
FIG. 8 is a frequency plot showing the frequency spectrum of the output of the circuit of FIG. 7.

Noise generator block 65 of FIG. 5 contains two identical noise generators one of which is shown on FIG. 7. Each noise generator comprises a plurality of shift registers 127 connected in serial fashion. A clock input is provided to the shift registers on line 129. This signal is provided from timer 61 and will be, for example, a 480 KHz signal. Two output bits from the shift register are added in adder 131 and provided as a data input. Bits from adder 131 will be shifted through the shift registers in a well-known fashion. The noise generator is essentially what is known as a pseudo random code generator and will provide a random output which will repeat every $2n$ clock cycles where $n$ is the number of positions in the shift register. For detailed explanation of such devices, see A Fast Method of Generating Digital Random Numbers by C. M. Rader, L. R. Rabiner, and R. S. Schafer published in the Bell System Technical Journal, November, 1970. When the output of the device of FIG. 7 on line 130 is observed on a frequency analyzer, the result will be as shown on FIG. 8. The curve 133 is essentially a sine $x$ divided by $x$ function. It will go from a maximum amplitude to zero at a point $f_a$ equal to the clock freqency. The nature of the curve is such that for the first one-tenth of the curve it is essentially flat. Assuming an input frequency of 480 Kilo Hertz, this means, that in the range from zero to 48 Kilo Hertz, the curve will be flat. This is within the range in which the system operates and thus the pseudo random noise is a suitable source of the background noise 27 and it can also be used as an input to the commutating filter in developing the doppler spectra. It should be noted that the curve 133 also has more peaks further out on the frequency spectrum. These will be filtered out by normal filtering in the system and can be disregarded.

Figure 9:
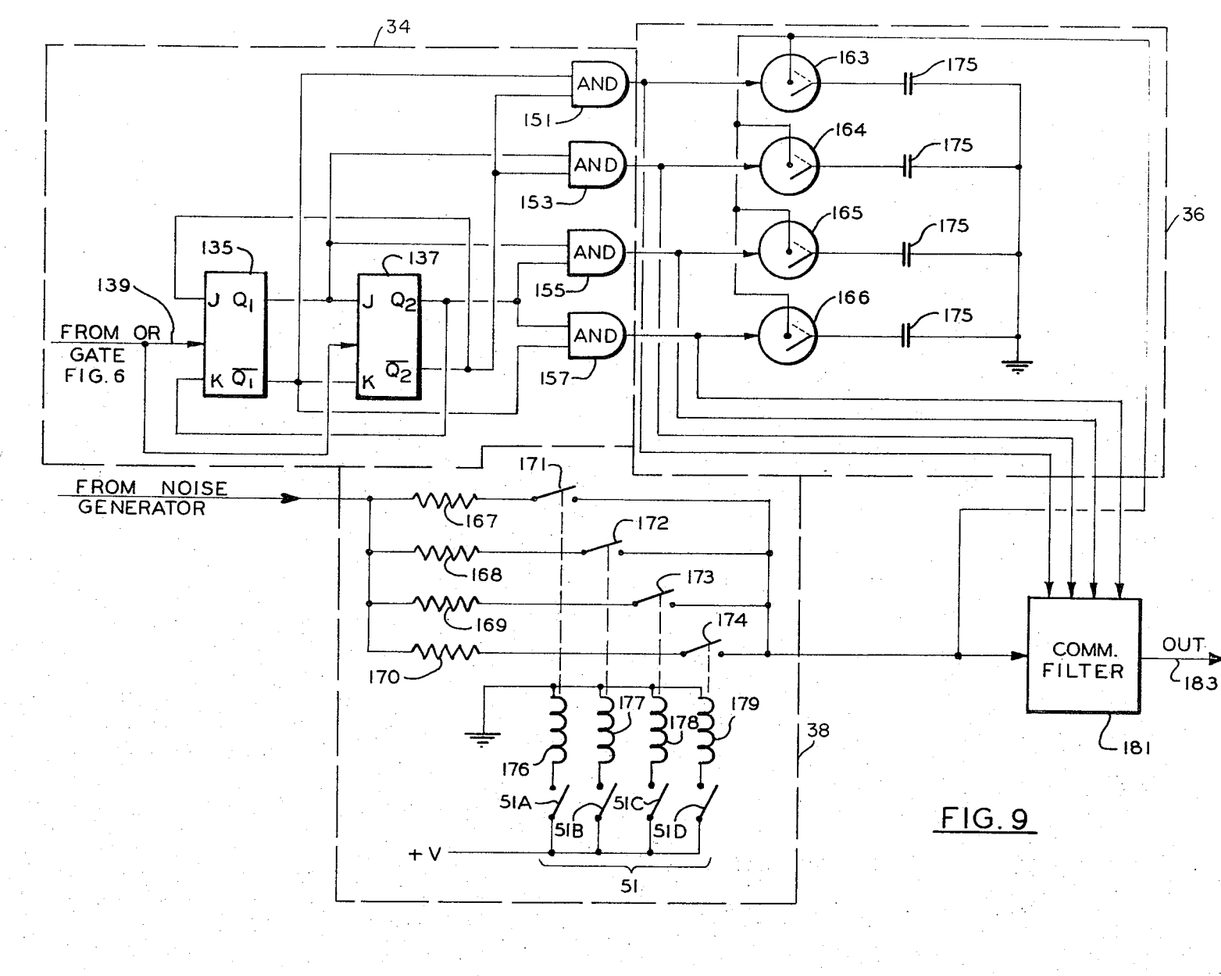
FIG. 9 is a logic-circuit diagram of the commutating filter of FIG. 5.
Figure 9A:
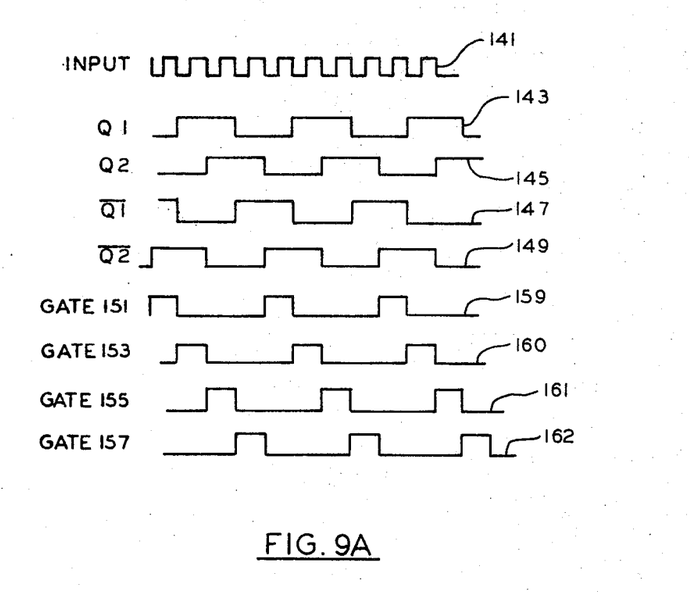
FIG. 9a is a waveform diagram showing various waveforms present in the circuit 9.

A typical commutating filter 83 of FIG. 5 is shown on FIG. 9. The filter may be thought of comprising three basic sections. These include the means for generating ccommutation signals enclosed within the dotted block 34 the switching and capacitive portions of the filters enclosed within block 36 and a time constant selection circuit which includes the resistive portion of the filters enclosed within block 38. Herein the portion included within block 36 will be designated as a capacitive commutation filter element. The output of one of OR gages 117 through 120 is provided as a clock input 139 to two JK Master-Slave flip flops 135 and 137. These flip flops will provide, at the negative going transition of the clock, an output corresponding to the input which was present when the clock previously went positive. For example, assume that both flip flops are reset. The $\overline{Q1}$ output and the $\overline{Q2}$ output from flip flop 135 and 137 respectively would then be present. Since the $\overline{Q2}$ output is provided as the J input to flipflop 135, when a positive going transition of the clock appears at the clock input a signal will be present at the J input to enable the flipflop to be set on the next negative going pulse. Thus, when such a negative going pulse occurs the J input will appear as a signal at the Q output. i.e., flipflop 135 will now be set. With flipflop 135 set, Q1 which is the J input to flipflop 137 is now present. So, on the next pulse on line 139, flip flop 137 would be set. The set or Q2 output of flip flop 137, which is now present, is provided to the K input of flip-flop 135. Thus, on the next pulse on line 139, flip flop 135 will be reset. This now provides a K input to flip flop 137 and on the next pulse flip flop 137 will be reset. This process will repeat continually. FIG. 9A shows the waveforms resulting. The input waveform is shown as waveform 141, Q1 as 143, Q2 as 145, $\overline{Q1}$ as 147 and $\overline{Q2}$ as 149. These four outputs are decoded in AND gates 151, 153, 155, and 157. AND gate 151 has as inputs $\overline{Q1}$ and $\overline{Q2}$. AND gate 153 has as inputs $\overline{Q2}$ and Q1. AND gate 155 has as inputs Q1 and Q2. AND gate 157 has as inputs $\overline{Q1}$ and Q2. Since an AND gate will have an output only when both inputs are present, the resulting outputs of the AND gates 151, 153, 155 and 157 will be as shown by waveforms 159 through 162.

If the frequency of the waveform of $\overline{Q2}$, is equal to the doppler center freqnency, then it is evident that the outputs of gates 151, 153, 155 and 157 effectively break up this waveform into 90° segments. That is, during the first half or first 90° of the positive cycle of the $\overline{Q2}$ waveform gate 151 will have an output. During the second half of the positive cycle gate 153 will have an output. During the first half of the negative cycle gate 155 will have an output. And during the second half of the negative cycle gate 157 will have an output. The outputs of gates 151, 153, 155 and 157 are provided as respective control inputs to switches 163 through 166. These switches are shown symbolically as a single pole single throw switch, but in actuality they would normally be transistor type switches. However, to simplify the drawing, they have been shown in this manner. The manner of constructing such switches using such transistors is well known to those skilled in the art. The input to one of the terminals of each of switches 163 through 166 is provided from noise generator 65 of FIG. 5 and would correspond to the output on line 131 of FIG. 7. This input is first provided through one or more of the resistors 167 through 170 and switches 171 through 174 to be described below. Connected to the other switch terminal of each of switches 163 through 166 is a capacitor 175 to ground. Switches 171 through 174 are in actuality relay contacts controlled by relay coils 176 through 179. The respective relay coils are controlled by switches 51A through D corresponding to switches 51 on the front panel of FIG. 4. The relays will switch in one or more of the resistors and thereby control the time constant of the resistor and capacitor 175 combination. The resistors will be assigned values which are binary in nature so that switches 51A through 51D may be operated in various combinations. For example, resistor 167 could have a relative value of 1, resistor 168 a value of 2, 169 a value of 4, and resistor 170 a value of 8. Because the switches 163 through 166 are cycled at the doppler center frequency, this frequency will be passed by the filter. The filter will also pass frequencies on either side of this and will have a band pass which is symmetrical and equal to ½πNRC on each side or a total band pass of $1/\pi NRC$, where $N$ is the number of capacitors 175, which in this case is four. For design details regarding this type of filter see Digital Filters with IC's boost Q Without Inductors by William R. Harden, Electronics, July 24, 1967 and Commutating Filter Techniques by Bud Broeker, Motorola Application Note HN334.

This filter will give a fall off of 6dB per octave. The doppler spectra is more nearly approximated by twice this or 12dB per octave. Therefore, a second identical capacitive commutation filter element indicated by block 181 is connected in series with the first filter. Element 181 shares the portions designated by block 34 and 38 with the first capacitive commutation filter element 36. The output from this element on line 183 will be a spectra correctly shaped to represent a doppler return with a center frequency equal to the frequency of the input on line 139.

Figure 10:
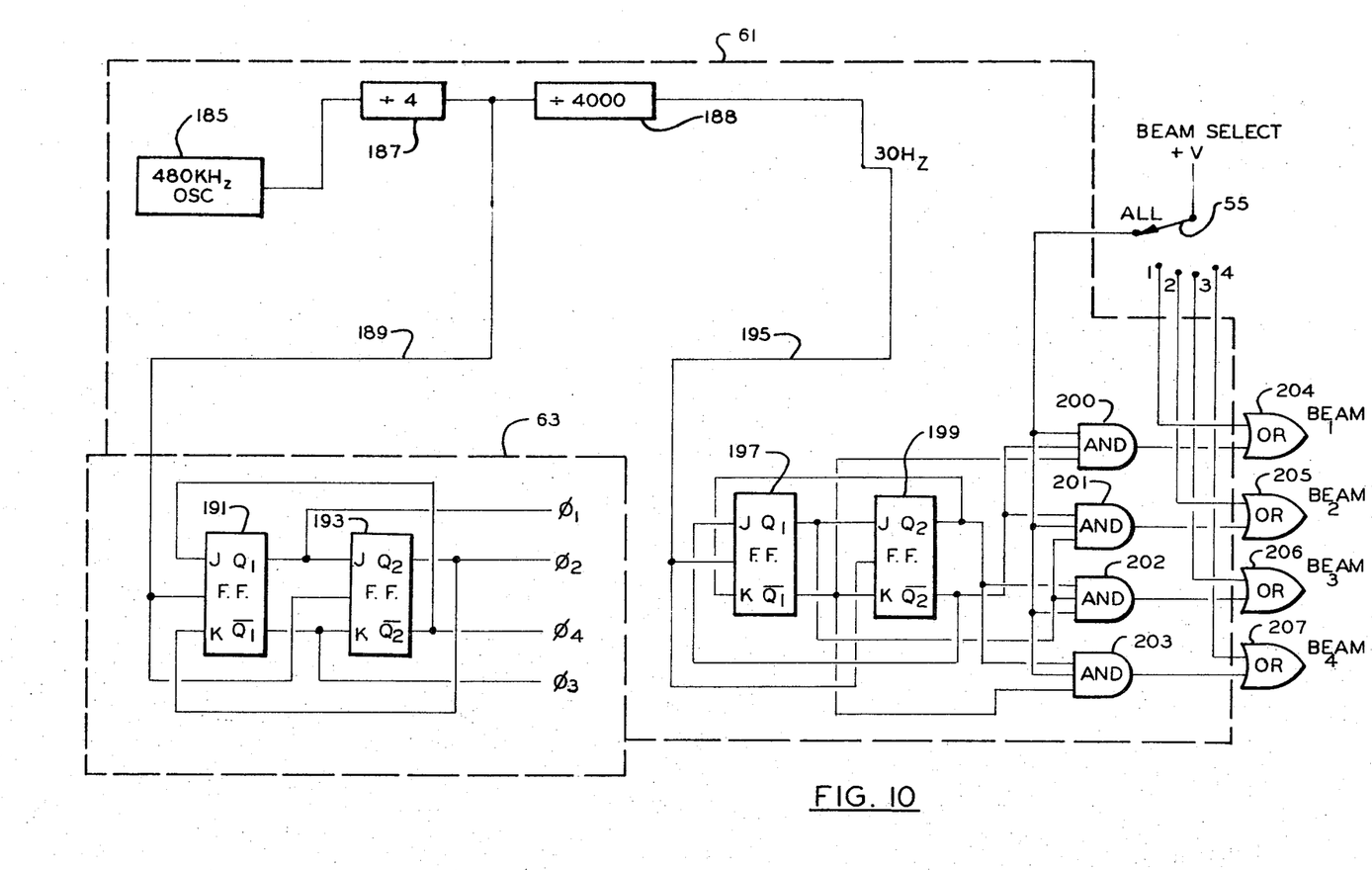
FIG. 10 is a block-logic diagram showing the timing circuits, leakage generator, and beam multiplexing of FIG. 5.

FIG. 10 is a basic logic diagram of the timer 61 and leakage generator 63 of FIG. 5. A 480 Kilo Hertz oscillator 185 provides an output at that frequency to counter chains 187 and 188 arranged to divide the 480 Kilo Hertz signal down to a 120 Kilo Hertz and a 30Hz signal. The 120 Kilo Hertz pulse train on line 189 will be used to generate the leakage signal which, it will be remembered from above, must be at a frequency of 30 Kilo Hertz. (The frequencies used herein are used as examples for a particular radar system. It will be recognized that where other modulation frequencies and switching frequencies are used, the same principles may be applied with different frequencies). The output on line 189 is provided to a pair of flip flops 191 and 193 arranged in exactly the same manner as flip flops 135 and 137 of FIG. 9. Referring to the waveform diagram of FIG. 9a, it can be seen that the Q1, Q2, $\overline{Q1}$ and $\overline{Q2}$ outputs will provide four signals of the same frequency but shifted 90° from each other. This frequency will be the 120 KHz input divided by 4 or 30 KHz. The reason is that, although the leakage signal will be at 30 Kilo Hertz, it will in general have a different phase angle during each beam period. Therefore, to properly test the equipment, it is necessary that various phase relationships be checked. As a means of testing this capability, these four signals separated by 90° have been selected and a different one will be provided during each beam period.

The 30 Hertz signal on line 195 is provided as a trigger input to two flip flops 197 and 199. These are also arranged in exactly the same manner as flip flops 135 and 137 of FIG. 9. The outputs of these two flip flops 197 and 199 are connected to AND gates 200 through 203 in exactly the same manner as the outputs of flip flops 135 and 137 are connected to AND gates 151, 153, 155 and 157. Thus, the outputs of AND gates 200 through 203 will correspond to the waveforms 159 through 162 of FIG. 9a. These provide the beam switching signals to multiplex the beam between the four positions. However, for test purposes, it is convenient to select one particular beam rather than sequencing through all four beams. Therefore, an additional enabling input is provided to AND gates 200 through 203 from a switch 55 corresponding to the switch of the same number on FIG. 4. Only when this switch is in the "All" position will AND gates 200 through 203 provide their sequential outputs. The outputs of gates 200 through 203 are the respective first inputs to OR gates 204 through 207. These OR gates have as their second inputs lines from the respective beam 1, 2, 3, or 4 outputs of switch 55. Thus, when switch 55 is selecting one of the beams, its respective OR gate 204 through 207 will have a constant output, with all other OR gates having no output. As indicated in describing FIG. 5, means can be provided so that rather than being internally generated the beam switching signals may be taken from the Doppler system. This portion of the system is not illustrated on FIG. 10 since it is not directly related to the circuits of the present invention. In its simplest form it would, as implied above, simply comprise a plurality of switches responsive to the input shown on FIG. 5 causing the beam switching outputs to be coupled either to the circuit shown or to the Doppler system.

Figure 11:
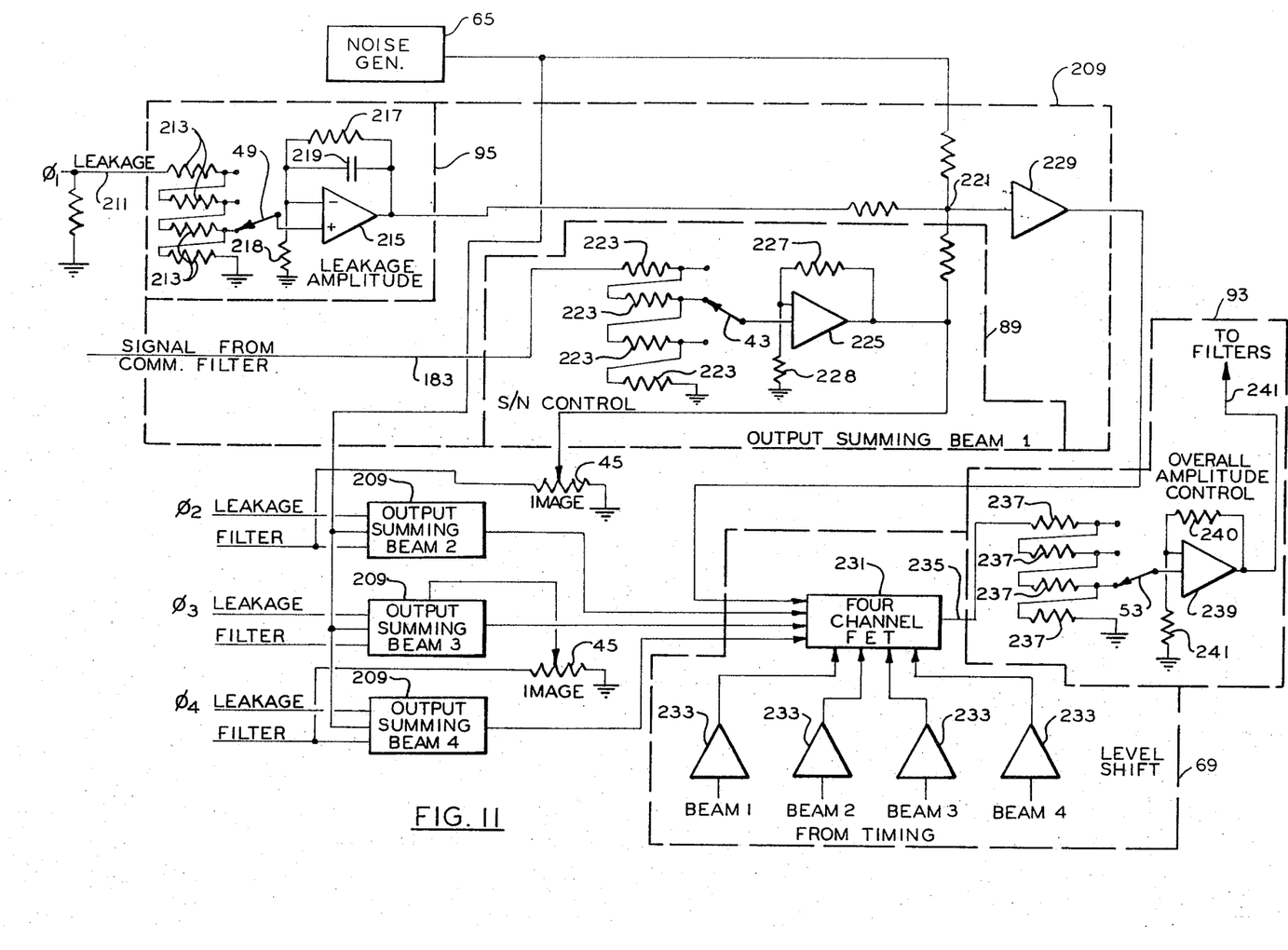
FIG. 11 is a block-circuit diagram showing gain control, summing and beam multiplexing portions of FIG. 5.

FIG. 11 illustrates the functions of blocks 89, 95, 69 and 93 of FIG. 5. The functions of blocks 89 and 95 are shown in detail for beam 1. Similar hardware to perform these functions for beams 2, 3 and 4 is contained within the blocks 209 on the Figure. One of the leakage signals is provided on line 211 to a switch 49 corresponding to the switch of the same number on FIG. 4 where one of a plurality of scaling resistors 213 may be selected. Through this resistor the leakage signal is provided as an input to a summing amplifier 215 which has resistors 217, 218 and a capacitor 219 in its feedback path. Capacitor 219 provides for filtering of the 30 Kilo Hertz squarewave signal to round it off to some extent. The output of the amplifier 215 is then summed at summing point 221 with the output of the noise generator of block 65 to add the required noise background. The signal from the commutating filter on line 183 is provided to a switch 43 corresponding to the same switch on FIG. 4 where any one of a number of scaling resistors 223 may be selected. These resistors provide the input to an amplifier 225 which has in its feedback path resistors 227 and 228. By controlling the signal amplitude with respect to the fixed noise amplitude from noise generator 65, the signal to noise ratio is effectively controlled. The doppler signal from amplifier 225 is also summed with the leakage and noise at point 221. The final input to summing point 221 is the output from the image potentiometer 45 corresponding to the same control on FIG. 4. This will add in a portion of the output from the beam 2 summing device 209. These signals are then passed through a summing amplifier 229 to provide an output signal which will be a composite including the doppler signal from the input on line 183, the leakage from line 211, the noise from noise generator 207, and the image signal from potentiometer 45. Similarly, in the summing blocks 209 for beams 2, 3 and 4, the noise, the leakage signal and the filter outputs will be summed. The summing for beams 2 and 4 will not include an image signal. The output of beam 2 block 209 provides the image for beam 1 and similarly the output of beam 4's block 209 provides, through a second potentiometer 45, the image signal for beam 3. The four composite signals are provided as inputs to a four channel FET 231. FET 231 is a device which will switch one of four inputs to its output in response to one of four control signals. The control signals are provided by the outputs of OR gates 204 through 207 of FIG. 10. Each is first provided to a level shifter 233 which will shift the level of the OR gate output, which was at a TTL logic level, to a voltage to properly control FET 231. Thus, in response to the beam control signals from level shifters 233, which will be essentially as shown on waveforms 159 through 162 of FIG. 9a, four channel FET 231 will sequentially provide at its output 235 each of its four inputs. The output on line 235 is provided to switch 53 corresponding to the switch of the same number on FIG. 4 where one of a plurality of scaling resistors 237 may be selected as an input to amplifier 239 which has fixed resistors 240 and 241 in its feedback path. By selection of one of resistors 237 the overall amplitude of the signal is controlled in a well known manner. The output of amplifier 239 on line 241 is provided to filters 97 and 99 of FIG. 5. The outputs of the filters are then the simulator outputs to be provided to the doppler system. Filters which will perform the required functions may be purchased from the Hisonics Inc. of Olathe, Kan.

Figure 12:
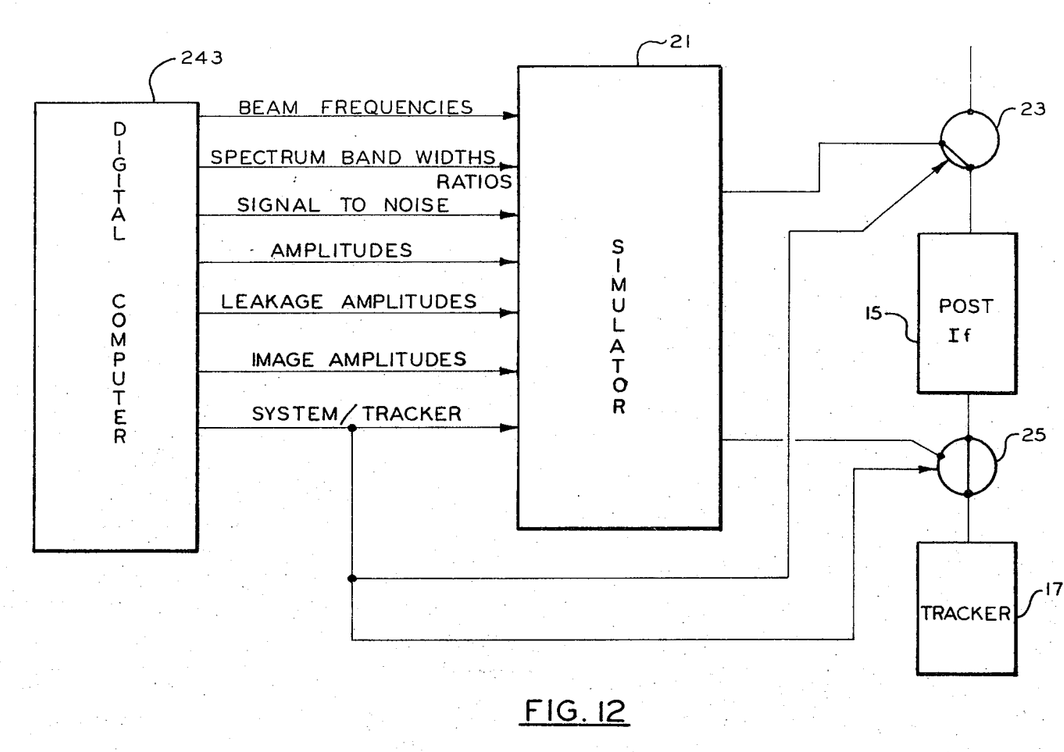
FIG. 12 is a block-diagram showing how the simulator of the present invention may be automatically controlled by a digital computer.

It should be noted that the system shown herein can very easily be adapted to automatic control by a digital computer. For example, the frequency select binary code into decoder 115 of FIG. 6 can just as well be provided by a digital computer as by a front panel switch as shown on FIG. 4. The computer could then sequence through various combinations and automatically test the system for various flight conditionss. Similarly, the various switches 43, 45, and 49 on the panel of 54 could be replaced by solid state switches responsive to a computer output signal. A program could then be written for a digital computer to test various signal to noise ratios, signal amplitudes, leakage amplitudes, etc. The basic overall system in that case would be as shown on FIG. 12. The digital computer 243 would provide, in binary form, the beam frequencies, spectrum bandwidths, signal to noise ratios, signal amplitudes, leakage amplitudes, and system/tracker outputs to the simulator 21 in lieu of the controls of FIG. 4. The simulator outputs would be provided in the same manner as shown on FIG. 1 to switches 23 and 25 connecting them respectively to post IF 15 and tracker 17. However, instead being manual switches on as shown on FIG. 1, these switches 23 and 25 would now be solid state switches responsive to the output of computer 243. Thus, it would be possible with this arrangement to connect the simulator to the radar system and with the proper program in the computer, automatically run a comprehensive check over a long period of time without the need for an operator.

Thus, a doppler signal simulator which provides an output which very closely approximates the actual doppler signal found in a doppler system has been shown. In addition to simulating the white noise and doppler signal, leakage, image, signal to noise ratios, and other amplitude ratios normally found in actual doppler inputs, may be simulated. The system uses digital techniques throughout and is thus very adaptable for use in automatic testing with a digital computer.

Although a specific embodiment has been shown and described, it will be obvious to those skilled in the art that various modifications may be made without departing from the spirit of the invention which is intended to be limited solely by the appended claims.

We claim:

1. Doppler Signal Simulation apparatus comprising:

a. means to generate wide band white noise;
b. means to generate a plurality of doppler return signals, including signals of at least two different frequencies;
c. a plurality of summing means to sum said white noise with each of said plurality of doppler signals; and
d. means to provide as a further input to at least one of said summing means at least a portion of another of said doppler signals which is at a different frequency to thereby simulate an image beam signal.

2. Apparatus to produce a signal simulating a doppler return signal comprising:
a. a white noise generator;
b. means to generate a first pulse train at the desired center frequency of the doppler signal; and
c. a first commutation filter including means to divide said pulse train into four pulse trains each of which will have pulses which are on for a different 90° of full 360° of each pulse of said first pulse train, a capacitive commutation filter element, and a resistive portion said commutating filter having the output of said white noise generator as a signal input with said four pulse trains as switching inputs said commutation providing the simulated doppler return signal at its output.

3. The invention according to claim 2 and further including a second commutating filter in series with the output of said first commutating filter.

4. The invention according to claim 3 and further including means to vary the time constant to said first and second commutating filters to thereby vary the bandwidth of the output.

5. The invention according to claim 2 wherein said noise generator comprises a pseudo random code generator.

6. A doppler signal simulator comprising:
a. means to generate a doppler composite signal including at least a first doppler return signal at a first frequency and broad band white noise;
b. means to generate a second doppler return signal at a second frequency; and
c. means to sum at least a portion of said second doppler signal with said composite signal to thereby simulate an image beam.

7. A doppler signal simulator comprising:
a. means to generate a plurality of frequencies representing the center frequencies of each of a plurality of doppler return signals obtained from different beams transmitted in different directions;
b. first means to generate wide band white noise;
c. a plurality of commutating filters all having as inputs said white noise and each having one of said plurality of center frequencies as an input and providing an output which simulates a doppler signal with a center frequency equal to its input;
d. means to generate a plurality of beam switching outputs said outputs occuring in sequence;
e. multiplexing means having the outputs from said plurality of filters as signal inputs and said beam switching inputs as control inputs to provide each of said signal inputs as an output in sequential manner in response to corresponding beam switching control inputs.

8. The invention according to claim 7 and further including means to select system test or tracker test and wherein said means to generate a plurality of frequencies is adapted to generate two sets of a plurality frequencies in response to said selection means, one set representing the frequencies found at the input to a doppler system post if stage in response to a system test selection and a second set representing the frequencies found at the tracker input of a doppler system, in response to a tracker test selection.

9. The invention according to claim 8 wherein said frequency generation means comprises:
   a. a first oscillator
   b. a second oscillator,
   c. a plurality of divide by N counters, and
   d. means to provide the output of one of said first and second oscillators to said plurality of counters in response to said selection means.

10. The invention according to claim 9 wherein said a plurality of divide by N counters is greater than the plurality of beams and further including decoding logic to select from said plurality of counters a number of signals equal to said plurality of beams and means to provide a binary signal to said decoding logic to make said selection.

11. The invention according to claim 10 wherein said means to provide a binary signal comprises a switch.

12. The invention according to claim 10 wherein said means to provide a binary signal comprises a digital computer.

13. The invention according to claim 10 and further including a plurality of voltage controlled oscillators each having a separate control input, selection input means, and logic means having the outputs of said voltage controlled oscillators and said the outputs of decoding means as inputs and providing one of said inputs as outputs in response to said selection means.

14. The invention according to claim 7 wherein said frequency generation means comprise a plurality of voltage controlled oscillators.

15. The invention according to claim 7 and further including second means to generate white noise and means to add said white noise to the output of each of said commutating filters.

16. The invention according to claim 15 wherein each of said first and second white noise generators comprises a pseudo random code generator.

17. The invention according to claim 7 wherein each of said commutating filters further includes means to provide one of several time constants and further including input means to select one of said time constants.

18. The invention according to claim 17 wherein said means to provide several time constants comprise a plurality of resistors which may be selectively connected into said filter by operation of a plurality of associated relays and said means to select comprise means to operate said relays.

19. The invention according to claim 7 and further including means to generate a leakage signal and means to add said leakage signal to each of said filter outputs.

20. The invention according to claim 19 and further including means to add the output of one of said filters to that of another of said filters.

21. The invention according to claim 19 and further including means to control the amplitudes of said leakage signal, a plurality of means to control the amplitudes of said filter outputs and means to control the amplitude of the output of said multiplexer.

22. The invention according to claim 21 wherein said leakage signal generator generates a plurality of signals all at the same frequency but at different phase angles, a different one of said signals being added to each of said plurality of filter outputs and said leakage amplitude control means include a separate amplitude control means for each of said signals.

23. The invention according to claim 7 and further including, in said multiplexer, means to select any one input signal as a constant output in response to a control input.

24. A doppler signal simulator to simulate the signal input to the post IF or tracker of a doppler navigation system of the type which transmits X beams sequentially in different directions obtaining thereby in sequence X different doppler return signals said apparatus comprising:
   a. means to generate at least X different frequencies representing doppler center frequencies;
   b. at least one pseudo random code generator generating white noise;
   c. X commutating filters having the output of said code generator as signal input and one of said X frequencies as a switching input;
   d. X first amplitude control means having the outputs of said X filters as respective inputs;
   e. means to generate X leakage signals all having the same frequency but each having a different phase,
   f. X second amplitude control means having said X leakage signals as respective inputs;
   g. summing means to sum the respective outputs of said first and second amplitude control means and the output of said pseudo random code generator;
   h. means to generate X pulse trains, the pulses on respective trains occuring in sequence;
   i. a multiplexer having the outputs of said X summing means as signal inputs and said X pulse trains as switching inputs to sequentially switch said X signal inputs to the output of said multiplexer;
   j. third amplitude control means having the output of said multiplexer as an input; and
   k. filter means having the output of said amplitude control means as an input and providing its output as the output of said simulator.

25. The invention according to claim 24 wherein each of said amplitude control means comprise an operational amplifier having a fixed feedback resistor and a plurality of inputs resistors and means to selectively cause said input resistors to be placed between the input signal and said amplifier.

26. The invention according to claim 25 and further including means to select system test or tracker test wherein said means to generate at least X different frequencies is adapted to generate two sets of at least X different frequencies in response to said selection means, one set representing the frequencies found at the input to a doppler system post if stage in response to system test selection and a second set representing the frequencies found at the tracker input of a doppler system, in response to a tracker test selection.

27. The invention according to claim 26 wherein said frequency generation means comprises:
   a. a first oscillator
   b. a second oscillator,
   c. a plurality of divide by N counters, and
   d. means to provide the output of one of said first and second oscillators to said plurality of counters in response to said selection means.

28. The invention according to claim 27 wherein said plurality of divide by N counters is greater than said X beams and further including decoding logic to select from said plurality of counters a number of signals equal to X and means to provide a binary signal to said decoding logic to make said selection.

29. The invention according to claim 28 and further including a plurality of individually controlled voltage controlled oscillators each having a separate control input, a selection input means and logic means having the outputs of said voltage controlled oscillators and said decoding means as inputs and providing one of said inputs as outputs in response to said selection input means.

30. The invention according to claim 29 wherein said multiplexer output is provided to a tracker band pass filter and a system band pass filter, the respective simulator outputs being taken from said filters.

31. The invention according to claim 30 wherein two random code generators are provided, one providing its output to said commutating filters and the other providing its output to said summing means.

32. The invention according to claim 31 wherein each of said amplitude switches, said frequency selection input, said tracker system made selection input, said bandwidth control inputs are provided by a digital computer.

33. The invention according to claim 32 wherein said multiplexer comprises a four channel FET switch.

* * * * *